Aug. 9, 1966     H. W. HOPKINS     3,265,308
YARD AND GARDEN SPRAY DEVICE
Filed March 16, 1964
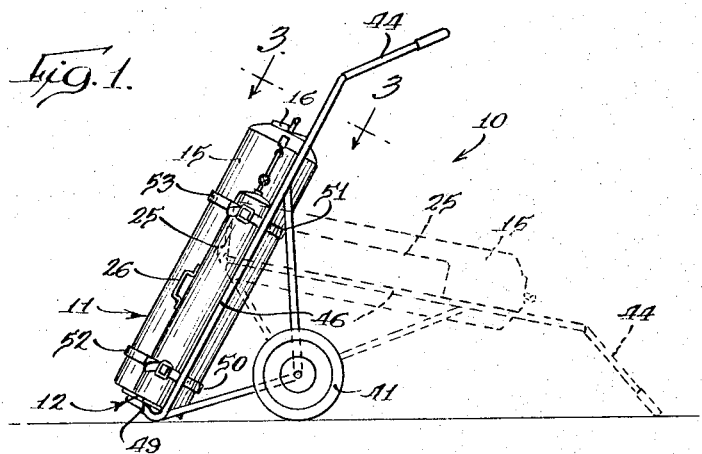
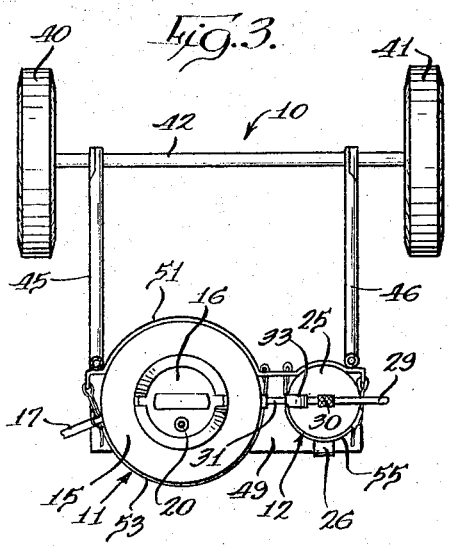
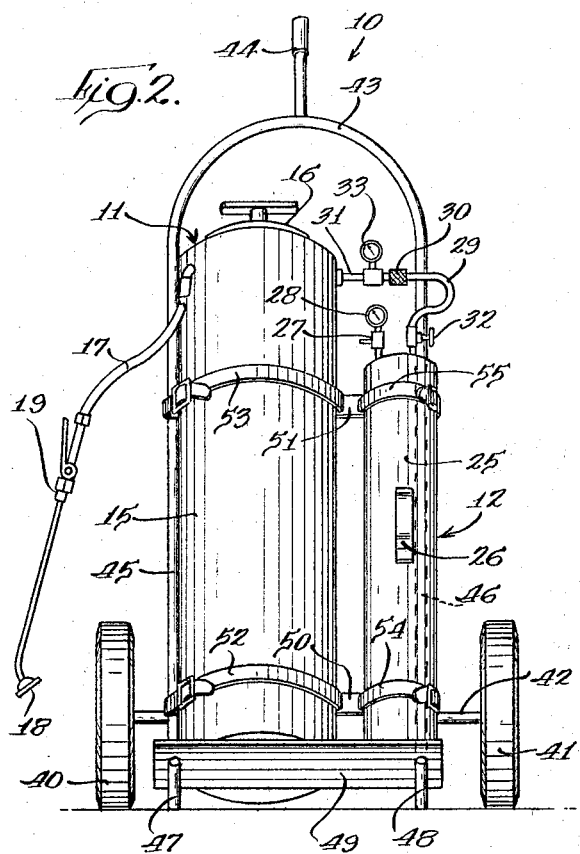
INVENTOR.
Homer W. Hopkins
BY
Hofgren, Wegner,
Allen, Stellman & McCord
Atty's

United States Patent Office 3,265,308
Patented August 9, 1966

3,265,308
YARD AND GARDEN SPRAY DEVICE
Homer W. Hopkins, 1201 Meriden St., Mendota, Ill.
Filed Mar. 16, 1964, Ser. No. 351,913
2 Claims. (Cl. 239—172)

This invention relates to chemical spray equipment and, more particularly, to a light-weight portable home garden and yard spray device which need not be carried and has easy mobility and which can be charged with air pressure in a simple manner.

At the present time, pressure sprayers are well-known for use around yards and gardens and generally embody a spray tank which can be filled with liquid chemicals and then charged by operation of an air pump forming part of the unit. In order to build up adequate pressure for a desired spray a substantial amount of exertion in operating the pump is required and to cover a relatively large area the tank must be of such size and carry a volume of liquid which renders the device heavy to carry and unwieldy in use.

An object of this invention is to provide a new and improved chemical spray device for yard and garden use which avoids the effort and exertion in transporting the unit and in providing air pressure for the unit.

Another object of the invention is to provide a yard and garden spray device having a liquid chemical tank with a top fill opening, a separate compressed air tank and a wheeled cart for mounting both of the tanks including releasable attachment of the compressed air tank to the cart and a fluid line connection between the tanks with a quick-disconnect coupling whereby the compressed air tank may be simply detached from the chemical tank and the cart and taken to a source of compressed air, such as a gasoline service station or an air compressor such as may be found on a farm.

Still another object of the invention is to provide a spray device as defined in the preceding paragraph in which the fluid line connecting the two tanks further includes a shut-off valve to seal the compressed air tank when the fluid line is disconnected and a pressure regulating valve is connected into the fluid line to maintain a constant settable amount of pressure in the liquid chemical tank, the compressed air tank having an air inlet valve operable by the compressed air line at a service station and a pressure indicating gauge to indicate the pressure existing within the tank.

An additional object of the invention is to provide a light-weight home garden and yard spray device in which a wheeled cart has a frame with a handle at one end and a tank supporting platform at the lower end whereby a liquid chemical tank of a size approximating that of the cart may be attached thereto while resting on the platform with a compressed air tank also resting on the platform adjacent the chemical tank with means releasably-attaching the compressed air tank to the cart for release therefrom when recharging the compressed air tank, and a fluid line with suitable valving and a disconnect coupling connecting the tanks together whereby the liquid chemical tank is placed under a controlled amount of pressure to cause the emission of a spray from a spray nozzle associated with the liquid chemical tank.

Further objects and advantages will become apparent from the following detailed description taken in connection with the accompanying drawings in which:

FIG. 1 is a side elevational view of the spray device with the unit shown in an emptying position in broken line;

FIG. 2 is a front elevational view of the spray device; and

FIG. 3 is a sectional view taken generally along the line 3—3 in FIG. 1.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The invention disclosed herein embodies three major components, with a wheeled cart, indicated generally at 10; a liquid chemical unit, indicated generally at 11; and a compressed air unit, indicated generally at 12.

The liquid chemical unit 11 embodies a generally cylindrical tank 15 having an interior for receiving a liquid solution of chemicals through a wide opening top which is closed by a cover 16 which fastens to the tank body by means of a spiral lock in a known manner. The hand spray is connected to the tank 15 by a length 17 of rubber hose having a spray nozzle 18 which is operable by a manually controlled valve 19. A solution is mixed to the proper proportions and carried in the tank 15 by filling through the open top and the cover 16, when fully closed, forms an air-tight seal for the interior of the tank. The interior of the tank is placed under pressure to the desired amount by the compressed air unit 12, subsequently to be described.

There is a pressure release valve 20 in the cover 16, in the form of a needle valve, as known in the art, and which can be depressed when it is desired to release the pressure from within the tank 15, as when the cover 16 is to be removed for emptying of the contents.

As will be seen in the drawing, the tank 15 is of a substantial size and a height closely approximating that of the cart 10 whereby a substantial volume of liquid chemical solution can be transported and save repeated fillings which are normally required when a tank is used of a size to be carried around the yard.

The compressed air unit 12 includes a cylindrical pressure tank 25 constructed to withstand substantial pressure and having a handle 26 rendering the tank portable. The tank is of a size to be easily carried by a user of the equipment and having an interior volume approximately one-fourth that of the liquid tank 15. The tank 25 has an air inlet valve 27 and a pressure gauge 28 extending from the top thereof with the air inlet valve 27 being in the form of a standard tire valve and core used for pneumatic tubes and which is readily operable by the compressed air hose as found at a gasoline service station. The gauge 28 indicates the pressure existing within the tank 25. A fluid line extends between the compressed air tank 25 and the liquid tank 15 and includes a length of copper tubing 29.

The length of tubing 29 carries a female part of a quick-disconnect coupling 30 with another length 31 of copper tubing extending from the liquid tank 15 and carrying a male part of the quick-disconnect coupling. In order to insure sealing of the compressed air tank 25 when the fluid line is disconnected, a cut-off valve 32 is connected into the line which extends from the compressed air tank 25.

The line 31 extending from the liquid tank 15 includes an adjustable air pressure regulating valve 33 having a gauge associated therewith, this valve being of the type known in the art to control the charging at a continuous rate of the liquid chemical tank 15 by the compressed air in the tank 25. The valve 33 permits the operator to control and determine the pressure in the spray tank.

The liquid tank 15 and compressed air tank 25 are mounted on the cart 10 for effortless movement. This cart embodies a pair of rubber-tired wheels 40 and 41 mounted by means of bearings (not shown) on an axle 42 which is suitably mounted to an inverted U-shaped frame 43 having a handle 44 extending from the upper end thereof and with the lower ends 45 and 46 of the frame having upturned extremities 47 and 48 respectively to which a platform 49 is secured as by suitable means, such as welding. This platform provides a support for the tanks 15 and 25. Additionally, a pair of brackets 50 and 51 span the parts 45 and 46 of the frame, with each being suitably contoured, as shown for bracket 51 in FIG. 3, to nestingly receive the tanks. Each of the brackets 50 and 51 has a pair of releasable straps with straps 52 and 53 being provided for securing the liquid chemical tank 15 to the cart and the straps 54 and 55 securing the compressed air tank 25 to the cart.

In operation, with the cover 16 removed and the tanks as shown in a generally upright position in FIG. 1, liquid chemical solution can be inserted in the tank 15 and the cover 16 tightly secured. The compressed air tank, assuming that it has a charge of air therein, can then be coupled to the tank 15 through the quick-disconnect coupling 30 and opening of the shut-off valve 32. This supplies pressure air to the tank 15, with the rate and amount of pressure being controlled by the regulating valve 33. An operator can then easily pull the cart about as being used while operating the spray nozzle 18 through the manual valve 19 connected to the liquid tank 15.

When it is necessary to have an added supply of air, the tank 25 can be removed by closing the shut-off valve 32 and releasing the quick-disconnect coupling 30. The straps 54 and 55 are then unbuckled and the compressed air tank can be lifted from the cart by means of handle 26 and the tank taken to a compressor, such as found at a gasoline service station, for recharging. The compressed air tank can then be associated with the cart and liquid tank 15 by reversing the steps immediately described above. At such time as the liquid tank 15 is to be emptied or refilled, any residual pressure therein can be released by operation of the air release valve 20 and removal of the top 16. If it is desired to empty the tank, the unit can easily be tipped to the broken line position, shown in FIG. 1, in which the liquid tank 15 will empty itself.

It will be seen from the foregoing that this invention embodies structure which eliminates the carrying of a heavy tank on an operator's shoulder and eliminates the repeated recharging of the liquid chemical tank by a hand pump, as known now in the art, and which could cause serious overexertion. Also, the liquid chemical tank can be larger and thus give more coverage of the spray solution with a single charge of the compressed air tank. As an example, it has been found that in using a 4½ gallon spray tank with the air pressure regulating valve 33 set to maintain 13 p.s.i. on this tank, that the compressed air tank initially having a pressure of 95 p.s.i. was reduced to 42 p.s.i. upon complete discharge of the contents from the spray tank, so that in the structure as illustrated a single compressed air tank charge is more than enough to discharge a substantial amount of liquid in spray form.

I claim:

1. A chemical spray unit including, a liquid chemical spray tank having a spray nozzle, a base end and a top opening for filling and emptying thereof, a compressed air tank, a fluid line connecting said tanks together including a quick-disconnect coupling, and means facilitating handling of said tanks including a frame having an axle and a pair of ground-engaging wheels, a handle at an end of the frame remote from the axle and having a terminal end, a tank-supporting platform at the lower end of said frame for supporting the tanks in side-by-side relation, a tank support intermediate the ends of the frame on which the tanks partially rest, first fastening means including a releasable strap for securing the chemical tank to the frame, and second fastening means including a releasable strap for securing the compressed air tank to the frame, said spray unit having a spraying position and an emptying position, in said spraying position said chemical tank being supported in a generally upright position, and in said emptying position, said chemical tank having its base end elevated above its top and having the handle terminal end in engagement with the ground.

2. A home yard and garden sprayer comprising a wheeled frame having wheels on an axle, a tank-supporting platform extending across the frame, a handle at the upper end of the frame for pulling the frame along the ground, a liquid chemical tank of a height approaching that of the frame, a closable top opening for the tank to permit filling and emptying thereof and a pressure release valve for releasing pressure in the tank, means for holding the liquid chemical tank in secured relation on the cart platform for transport thereof, a compressed air tank of a size less than the chemical tank having an air inlet valve and a pressure gauge, a handle on the compressed air tank for carrying of the tank to and from a source of compressed air, means on the cart for releasably holding the compressed air tank on the platform next to the chemical tank in side-by-side relation, a fluid line connecting said tanks together, a quick-disconnect coupling in said line between the tanks whereby the tanks are separable, a shut-off valve between the coupling and compressed air tank to seal off the latter tank, and a pressure regulating valve in said fluid line, said platform and axle being at a greater vertical distance apart than the effective handle length spacing the frame from the ground when the frame is tipped to have the handle engage the ground whereby the liquid chemical tank slopes downwardly toward said top opening thereof and the liquid chemical tank can drain by gravity.

References Cited by the Examiner

UNITED STATES PATENTS

| 2,745,700 | 5/1956 | Phalen | 239—286 |
| 2,772,921 | 12/1956 | Nance | 239—172 |
| 2,923,480 | 2/1960 | Christian | 239—373 |

FOREIGN PATENTS

| 942,167 | 11/1963 | Great Britain. |
| 1,019,118 | 10/1952 | France. |

M. HENSON WOOD, JR., *Primary Examiner.*

EVERETT W. KIRBY, *Examiner.*

D. MOSELEY, V. C. WILKS, *Assistant Examiners.*